United States Patent [19]

Izumi

[11] 4,216,822
[45] Aug. 12, 1980

[54] AIRFLOW DISTRIBUTING DEVICE FOR AUTOMOTIVE AIR-CONDITIONING SYSTEM

[75] Inventor: Masao Izumi, Fujisawa, Japan

[73] Assignee: Nissan Motor Company, Limited, Yokohama, Japan

[21] Appl. No.: 897,917

[22] Filed: Apr. 18, 1978

[30] Foreign Application Priority Data

May 20, 1977 [JP] Japan .............. 52-65594[U]

[51] Int. Cl.$^2$ ........................... F28C 27/02
[52] U.S. Cl. ........................ 165/42; 98/2.06
[58] Field of Search ............ 165/42, 43, 23; 98/2-6; 285/137 R, 158

[56] References Cited
U.S. PATENT DOCUMENTS

| 2,729,158 | 1/1956 | Wilfert ................ 98/2.06 |
| 3,809,151 | 5/1974 | Scheidel ............... 165/42 |

FOREIGN PATENT DOCUMENTS 2309360 12/1976 France ...................... 165/43

Primary Examiner—Samuel Scott
Assistant Examiner—Theophil W. Streule, Jr.

[57] ABSTRACT

Hereindisclosed is an airflow distributing device which comprises a main duct in which air heating means and air cooling means are disposed; a casing located at a downstream end of the main duct and having therein three cells which are respectively communicated with selected portions of the passenger compartment through respective transmitting ducts, the casing being arranged to allow respective openings of the cells to face toward the chamber defined by the main duct; and a mode plate having a size to sufficiently cover the openings of the cells and having an opening therein, the mode plate being rotatably fixed at its center portion to the casing such that the opening thereof is able to open to at least selected one of the openings of the cells upon rotation thereof.

16 Claims, 14 Drawing Figures

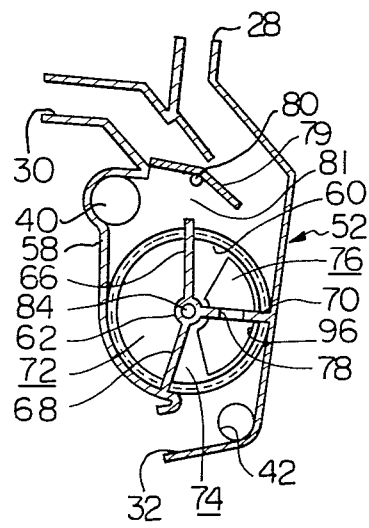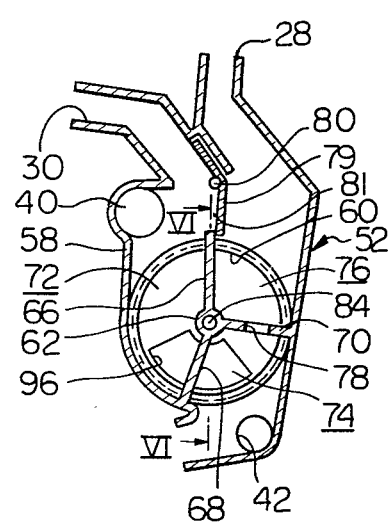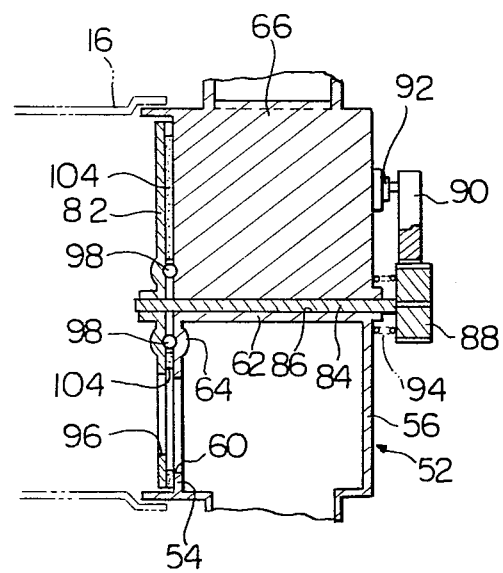

AIRFLOW DISTRIBUTING DEVICE FOR AUTOMOTIVE AIR-CONDITIONING SYSTEM

The present invention relates in general to an automotive air-conditioning system and more particularly to an airflow distributing device of the air conditioning system.

It is an object of the present invention to provide an improved airflow distributing device by which the desired amount of heated or cooled air is assuredly and reliably fed to selected portions of the passenger compartment of the vehicle.

It is another object of the present invention to provide an improved airflow distributing device which is simple in construction and easy to handle.

According to the present invention, there is provided an airflow distributing device for use with an automotive air-conditioning system having air cooling means and air heating means, comprising: a main duct containing therein the air cooling means and the air heating means for cooling and heating the air passing therethrough; a casing located at a downstream end of the main duct and having therein first, second and third cells which have respective openings facing toward the chamber defined by the main duct; first, second and third ducts which are respectively communicable with the first, second and third cells for providing fluid communication between selected portions of the passenger compartment and the cells; a mode plate member having a size to sufficiently cover the openings of the first, second and third cells and having therein an opening, the mode plate member being such arranged that said opening thereof is able to open to, at least selected one of the openings of the cells upon rotation thereof about a center axis thereof; and control means for remotely controlling the rotational movement of the mode plate member.

Other objects and advantages of the present invention will become apparent from the following description when taken in conjunction with the accompanying drawings, in which:

FIG. 1 is a sketch showing a prior art airflow distributing device;

FIGS. 2 and 3 are sketches showing another prior art airflow distributing device, in which FIG. 3 is a view taken from the line III—III of FIG. 2;

FIG. 4 is a sketch showing an airflow distributing device according to the present invention;

FIGS. 5A to 5F are views taken from the line V—V of FIG. 4, and show various operating modes of the device of the invention, respectively;

FIG. 6 is a view taken from the line VI—VI of FIG. 5F, showing a detailed construction of an important part of the device of the invention;

Figure 5A:
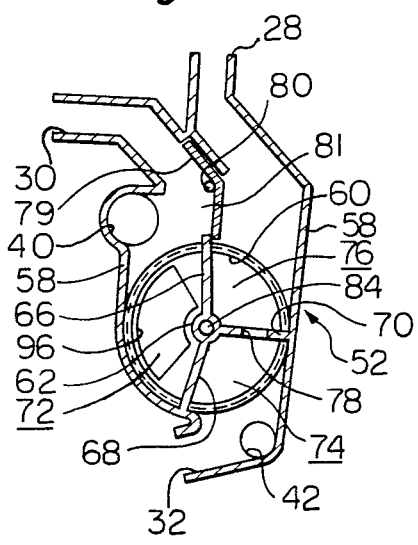

Prior to describing the construction of the airflow distributing device of the subject invention, explanation of prior art devices will be made with the aid of FIG. 1 and FIGS. 2 and 3 in order to clarify the inventive steps of the subject invention.

Figures 1, 2, 3, 4:
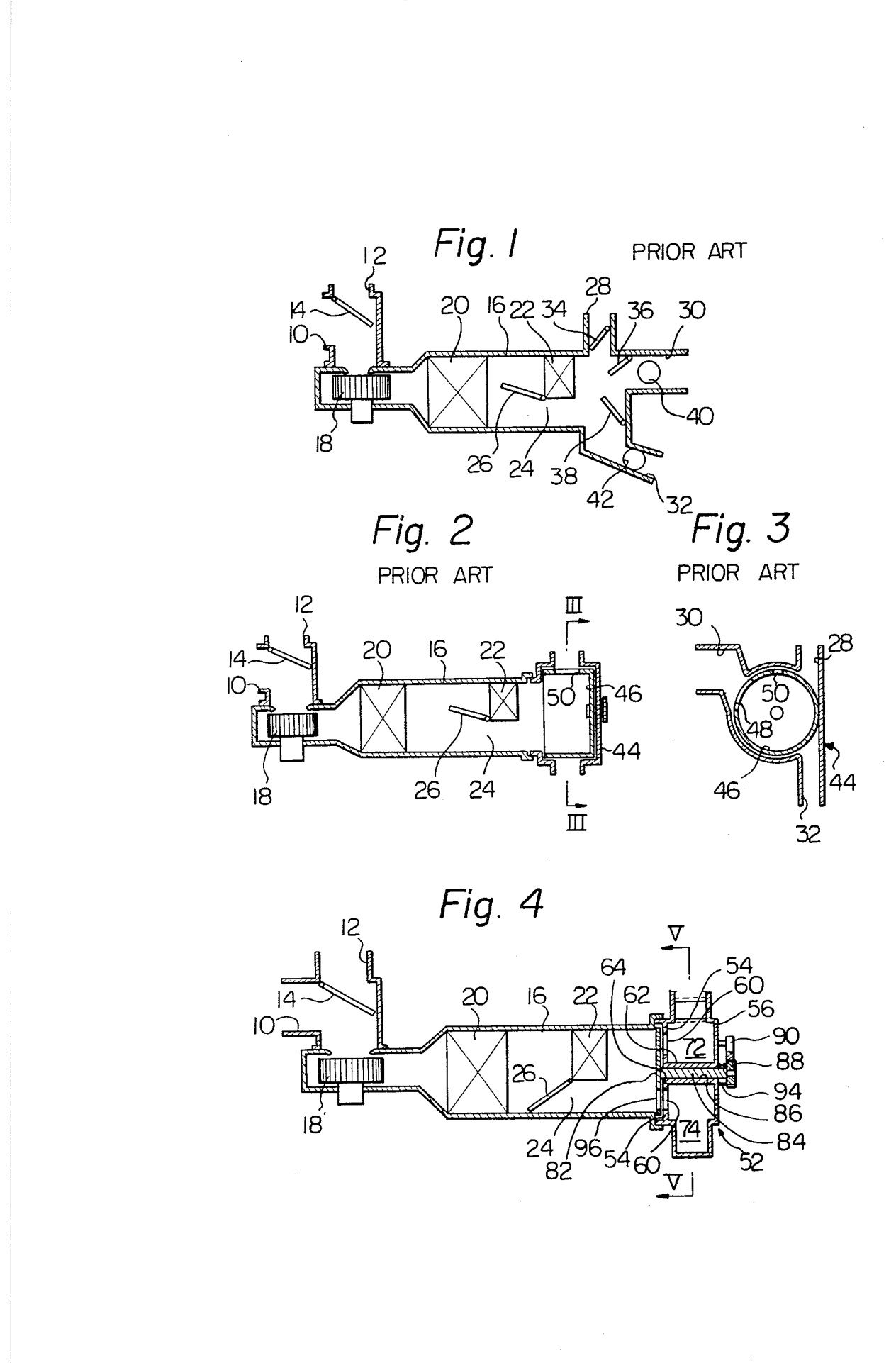

In FIG. 1, there is illustrated an airflow distributing device conventionally used. Such device is usually located under the dashboard (not shown) of a vehicle. The airflow distributing device shown comprises an indoor or passenger compartment air recirculation induction duct 10, an ambient air induction duct 12, a changeover damper 14 swingable to selectively close and open the ducts 10 and 12, a main duct 16 connected through a reduced portion thereof (no numeral) to the ducts 10 and 12, a blower 18 operatively disposed in the reduced portion, an evaporator core (cooling coil) 20 positioned in the main duct 16 downstream of the blower 18, and a heater core 22 disposed in the main duct 16 downstream of the evaporator core 20 so as to define a bypass passage 24 therein. Swingably disposed in the main duct 16 is an air temperature-flow control damper 26 which varies the ratio of the air amount passing through the heater core 22 to that passing through the bypass passage 24 so that when the heater core 22 operates, the air directed to the passenger compartment (not shown) has a desired temperature. The main duct 16 is formed at its downstream portion with three merged discharge ducts which are respectively a front window defroster or demisting duct 28 extending adjacent to a front window (not shown), a center discharge duct 30 arranged in the generally central portion of the instrument panel (not shown), and a lower discharge duct 32 extending to the front-lower portion of the passenger compartment. The ducts 28, 30 and 32 are respectively equipped with dampers 34, 36 and 38 at their upstream sections as shown. Laterally extending from the center discharge duct 30 are side window defroster ducts 40 which extend to side portions of the instrument panel. Denoted by numeral 42 in the lower discharge duct 32 is a rear duct which extends to a rear portion of the passenger compartment to transmit the air from the airflow distributing device to the rear portion. Usually, the discharge ducts 28 and 32 are used for transmitting the heated air passed through the operating heater core 22 and the discharge duct 30 is for the cooled air passing through the operating evaporator core 20.

When air-conditioning in the passenger compartment, ventilation of the same and/or defrosting of the front window is required, the dampers 14, 26, 34, 36 and 38 are remotely controlled to open or close their corresponding passages by a passenger in the compartment. However, in this type airflow distributing device, very complicated wire cable linkages are used for the remote control due to the excessive number of dampers. Furthermore, by the same reason, the assembling of the dampers and the linkages in their corresponding positions and providing complete sealing between each damper and its corresponding portion are time consuming. This induces high cost production of the devices.

In FIGS. 2 and 3, there is illustrated the other prior art airflow distributing device which partially solves the drawbacks encountered in the above mentioned prior art device of FIG. 1. For facilitation, description of the parts which are substantially the same as those of FIG. 1 will be omitted from the following. The device of FIGS. 2 and 3 uses a rotatable drum assembly as a substitute for the dampers 34, 36 and 38 of FIG. 1, which comprises a casing 44 connected to the downstream portion of the main duct 16. The casing 44 is provided at its side walls with a front window defroster duct 28, a center discharge duct 30 and a lower discharge duct 32 at space intervals, as is well shown in FIG. 3. Rotatably disposed in the casing 44 is a drum 46 which is arranged so that its open end faces toward the heater core 22 in the main duct 16. The drum 46 is formed with two openings 48 and 50 in the cylindrical wall thereof which are adapted to open to suitable adjacent two of the above-mentioned three ducts 28, 30 and 32 in response to rotation of the drum 46. With this, the airflow distribution is achieved. However, in this type device, it requires a considerable force to rotate the drum 46 because substantially whole cylindrical surface of the drum 46 is brakingly in friction contact with the inner surface of the casing 44. Furthermore, there is a severe limitation in increasing the area of the openings 48 and 50 because in the distributing device, it is necessary to provide that only one of the three ducts 28, 30 and 32 is in communication with the main duct 16. This inevitably means the reduction of airflow amount passing through the device.

The present invention contemplates to eliminate these drawbacks encountered in the above-mentioned prior art airflow distributing devices of FIGS. 1 to 3.

Referring to FIG. 4, there is shown an airflow distributing device according to the invention. For facilitation, the parts substantially the same as those of FIGS. 1 and 2 are denoted by the same numerals and detailed description of those will be omitted from the following. As is well understood from FIG. 4, the airflow distributing device of the present invention comprises substantially same parts as those of the prior art device of FIG. 2 except for the rightmost section thereof. For clarification of description, the following explanation on the structure of the subject device will be made with the aid of FIGS. 5A and 6 as well as FIG. 4. The subject device, more particularly the rightmost section of the same comprises a casing 52 which is substantially composed of parallel, opposed walls 54 and 56 and a side wall 58 to define a chamber therein. As will be seen from FIG. 4, the casing 52 is arranged to permit the wall 54 to face the chamber of the main duct 16. Preferably, the casing 52 is arranged to permit the wall 54 to be generally perpendicular to the longitudinal axis of the main duct 16 for the reason which will become apparent hereinlater. The wall 54 is formed with a circular opening 60 so as to provide a fluid communication between the chamber of the main duct 16 and that of the casing 52. Within the casing 52 is disposed a hollow shaft 62 which extends axially from an inner side portion of the wall 56 of the casing 52 to a portion where a center of the circular opening 60 is located. The leading end of the hollow shaft 62 is formed with a flange 64 as will be understood from FIG. 6. Radially outwardly extending from the hollow shaft 62 are first, second and third partition walls 66, 68 and 70 which are integral with the shaft 62 and are spaced from each other to form or define in the casing first, second and third cells 72, 74 and 76, as shown in FIG. 5A. With this, it will be appreciated that the circular opening 60 is divided into three sectors which are defined by a curved edge defining the perimeter of the circular opening 60 and axially extending ends of the first, second and third partition walls 66, 68 and 70. As is shown in FIG. 5A, an opening 78 is formed in the third partition wall 70 for providing communication between the second and third cells 74 and 76. The first, second and third cells 72, 74 and 76 are respectively communicated with a center discharge duct 30, a lower discharge duct 32 and a front window defroster duct 28 which are formed integrally with the casing 52. A damper 79 is swingably disposed in the casing 52 at a position adjacent the inlet openings of the front window defroster duct 28 and the center discharge duct 30. The damper 79 is swingable about its fulcrum 80 to take first and second positions, the first position being a position as shown in FIG. 5A to open the center discharge duct 30 and simultaneously to close a passage 81 between the first and third cells 72 and 76, the second position being a position as shown in FIG. 5D to close the center discharge duct 30 and simultaneously to open the passage 81. Side window defroster ducts 40 extend laterally from a location downstream of the first cell 72 and upstream of the center discharge duct 30 to side portions of the instrument panel. Denoted by numeral 42 is a rear duct extending to a rear portion of the passenger compartment.

Figure 9:
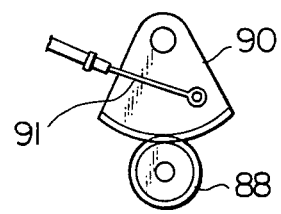
FIG. 9 is a sketch showing a mode plate controlling mechanism by which the mode plate is rotated.

In addition to the above, the following elements and measures are further necessary in the airflow distributing device of the invention. A circular mode plate 82 is arranged to cover the circular opening 60 of the casing 52 as shown in FIG. 4. The plate 82 is provided at its center section with a shaft 84 which is rotatably received or disposed in the axially extending through bore 86 formed in the shaft 62 so that the plate 82 is rotatable relative to the casing 52. As is best shown in FIG. 6, the leading end of the shaft 84, the portion projecting from the wall 56, is provided with a coaxially arranged gear 88 which is meshingly engaged with a sector gear 90. The sector gear 90 is pivotally connected via fulcrum member 92 to the wall 56 of the casing, as is well shown in FIG. 9. Denoted by numeral 91 in this drawing is a control wire which is connected at its one end to the sector gear 90 and at its other end to a control lever (not shown) which is manually operable by a passenger. Referring again to FIG. 6, a coil compression spring 94 is disposed about the shaft 84 between the gear 88 and the wall 56 to bias the gear 88 and thus the circular mode plate 82 rightwardly in FIG. 6, that is in a direction to press the mode plate against the wall 54 of the casing 52. As is shown in FIG. 5A, the mode plate 82 is formed with a sector opening 96. For the reason as will be described hereinlater, the longitudinal length of the sector opening 96 is smaller than that of the sector inlet opening of the first cell 72 and greater than that of the second cell 74. More specifically, the included angle defined by the side edges of the sector opening 96 is smaller than that of the sector opening of the first cell 72 but greater than that of the second cell 74. For temporally setting the mode plate 82 at its desired position upon mode section, positioning means is further employed.

Figure 7:
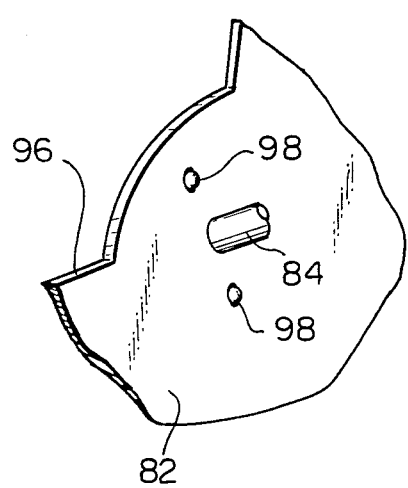
FIG. 7 is a segmental perspective view of a mode plate employed in the device of the invention.
Figure 8:
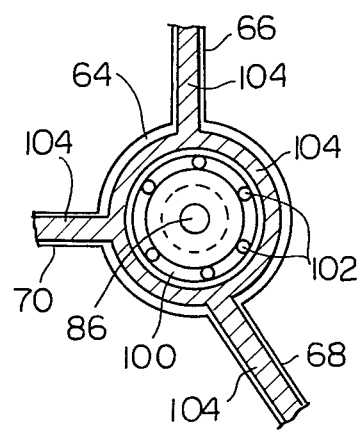
FIG. 8 is a segmental but enlarged front view of a casing having three cells, the openings of the cells being covered by the mode plate of FIG. 7.

The positioning means employed in the subject invention is shown in FIG. 7, which comprises two detent rotatable balls 98 which are disposed in the mode plate 82 to partially project a portion of their spherical surfaces therefrom, that is in a direction to face toward the outer surface of the flange 64 of the rod 62 in the casing 52. The two detent balls 98 are located diametrically opposite with respect to the shaft 84 fixed to the mode plate 82. The balls 98 are biased to move outwardly with respect to the mode plate by means of springs (not shown) disposed therein. As is seen in FIG. 8, the outer wall portion of the flange 64 is formed with an annular groove 100 which is concentric with the bore 86 formed in the shaft 62. Six hemispherical recesses 102 are formed in the annular groove 100 at evenly spaced intervals. The annular groove 100 receives the above-mentioned two detent balls 102 when the mode plates 82 is set to cover the circular opening 60 of the casing 52. Thus, upon rotation of the mode plate 82, the biased detent balls 98 are caused to enter corresponding opposed two of the recesses 102 to provide the temporal setting of the mode plate 82 for the desired positioning of the same. This operation is achieved by the aid of the biasing force generated by the coil spring 94. As is seen from FIG. 8, substantially all portions of the casing 52, which contact the inboard surface of the mode plate 82 are covered with suitable seal member 104 for providing sealing therebetween. If desired, such seal member may be applied to the inboard surface of the mode plate 82. Now, it should be noted that since the wall 54 of the casing 52 is arranged perpendicularly with respect to the longitudinal axis of the main duct 16, the force applied to the mode plate 82 by the air coming through the main duct 16 during operation of the subject device is effectively used for, in addition to the biasing force of the spring 94, pressing the mode plate 82 against the seal member 104 on the casing 52 thereby obtaining quite good sealing therebetween.

With the above construction, the airflow distributing device of the invention operates as follows; For clarification, explanation of the operation will be made by the aid of FIGS. 4 and 5A to 5F.

When ventilation without cooling and heating of the passenger compartment is required, the dampers 14 and 26 are moved to open the ambient air induction duct 12 and the bypass passage 24 respectively, and the mode plate 82 is moved to take a position shown in FIG. 5A to allow the sector opening 96 thereof to open to the first cell 72. With this, the ambient air is fed into the first cell 72 and then into the passenger compartment through the center discharge duct 30 and the side ducts 40 for ventilation.

When cooling of the passenger compartment is required, the mode plate 82 is kept at the same position as above and the damper 14 is moved to close the ambient air induction duct 12 to simultaneously open the indoor air induction duct 10. Then, the evaporator core 20 is actuated for cooling the air passing therethrough.

Figure 5B:
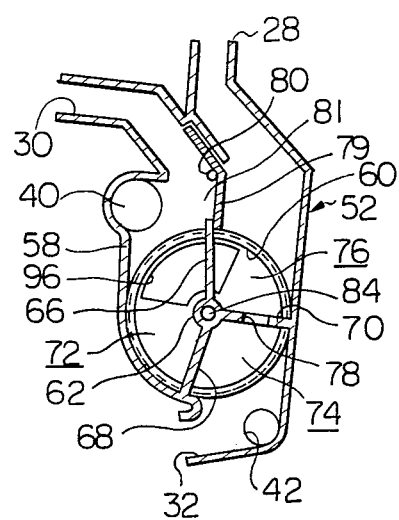

When rapid cooling of the passenger compartment is required, the mode plate 82 is moved to take a position, shown in FIG. 5B to allow the sector opening 96 thereof to open to both the first and third cells 72 and 76. Hence, part of the cooled air from the evaporator core 20 is fed into the front window defroster duct 28 for cooling parts located adjacent the front window. Further, by the provision of the opening 78 in the third partition wall 70, the other part of the cooled air is fed into the second cell 74 and into the lower discharge duct 32 and the rear duct 42 for cooling the front lower portion and the rear portion of the passenger compartment. Thus, the compartment is rapidly and evenly cooled.

Figure 5C:
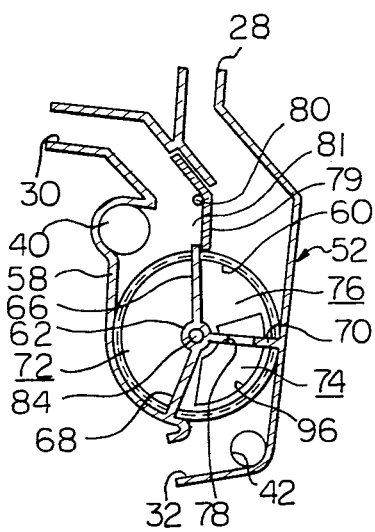
Figure 5D:
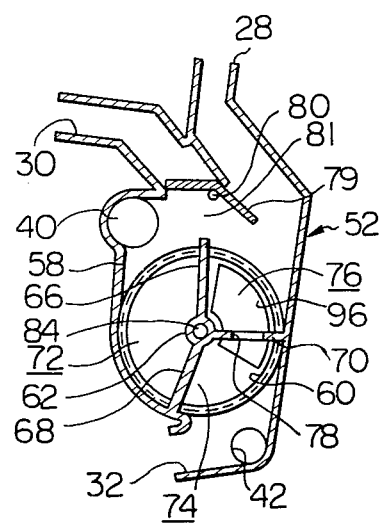

When heating of the passenger compartment is required, the damper 14 is set to open the ambient air induction duct 12 (or if desired, the damper 14 may be set to open the indoor air induction duct 10 closing the ambient air induction duct 12), and the damper 26 is set to allow the air from the blower 18 to pass through the heater core 22. Further, the mode plate 82 is set to take a position, as shown in FIG. 5C, wherein the sector opening 96 largely open to the second cell 74 and partially to the third cell 76. The heater core 22 is actuated for heating the air passing therethrough. With this, the heated air is fed into the discharge duct 32, the rear duct 42 and the front window defroster duct 28. It will be appreciated that the temperature control of the heated air fed to the passenger compartment is achieved by changing the angular position of the damper 26.

When rapid defrosting or demisting of the front window is required, the mode plate 82 is moved to take a position as shown in FIG. 5D wherein the sector opening 96 largely open to the third cell 76 and partially to the second cell 74. With this, the air amount fed into the front window defroster duct 28 is increased for rapidly defrosting of the front window. Thus, when the damper 79 is moved to take a position, shown in this drawing, to close the center discharge duct 30 and simultaneously open the passage 81, part of the heated air in the third cell 76 flows into the first cell 72 and into the side ducts 40 for defrosting side windows.

By moving the mode plate 82 into a position, as shown in FIG. 5E, wherein the sector opening 96 evenly opens to both the second and third cells 74 and 76, the air amount fed into the front lower portion and the rear portion of the passenger compartment is increased.

Further, by moving the mode plate 82 into a position shown in FIG. 5F wherein the sector opening 96 evenly opens to the first and second cells 72 and 74 and simultaneously moving the damper 79 to open the center discharge duct 30 and close the passage 81 as shown, the heated air from the main duct 16 is mainly fed into the center discharge duct 30, the side ducts 40, the lower discharge duct 32 and the rear duct 42.

What is claimed is:

1. An air flow distributing device for use with an automotive air-conditioning system having air cooling means and air heating means, comprising:
    a first casing containing therein said air cooling means and said air heating means for cooling and heating the air passing therethrough;
    a second casing located at a downstream end of said first casing and having therein first, second and third cells which have respective inlet openings facing the chamber defined in said first casing, said inlet openings being arranged to lie on a common flat plane;
    first, second and third ducts which are respectively communicable with said first, second and third cells for providing respective communications between given portions of the passenger compartment and said cells;
    a flat plate member having a size to sufficiently cover said inlet openings of said first, second and third cells and lying on said common flat plane to cover said inlet openings, said plate member having an opening and being rotatable about an axis perpendicular to the face of said plate member so that the opening is open to at least one of said inlet openings when said plate member assumes a given angular position; means for selectively taking first and second positions to direct air to said ducts, said first position being a position in which communication with said first cell and said first duct is established and simultaneously communication between said first and third cell is blocked, said second position being a position in which communication between said first duct is blocked and simultaneously communication between said first and third cell is established; and
    control means for remotely controlling the rotational movement of said plate member.

2. An airflow distributing device as claimed in claim 1, further comprising:

a hollow shaft member disposed in said second casing to form therearound said first, second and third cells; and a shaft connected at its one end to said plate member and rotatably disposed in said hollow shaft.

3. An airflow distributing device as claimed in claim 2, in which said second casing includes a front wall in which said openings of said first, second and third cells are formed and a back wall from which said hollow shaft member extends upstream.

4. An airflow distributing device as claimed in claim 3, in which said first, second and third cells are partitioned by first second and third partition walls which radially outwardly extend at spaced intervals from said hollow shaft member.

5. An airflow distributing device as claimed in claim 4, in which said plate member is such arranged that a front main surface thereof is substantially perpendicular to the axis of flow of the air passing through the chamber of said first casing.

6. An airflow distributing device as claimed in claim 4, further comprising biasing means for biasing said plate member to move toward said second casing to tightly press against said front wall of said second casing.

7. An airflow distributing device as claimed in claim 6, further comprising positioning means for temporarily setting said plate member at its desired position upon rotation to a desired position.

8. An airflow distributing device as claimed in claim 7, in which said positioning means comprises:

detent balls rotatably disposed in said plate member to partially project a portion of their spherical surfaces toward an upstream end of said hollow shaft member, said balls being biased outwardly with respect to said plate member;

a section of said upstream end of said hollow shaft member, said section being formed with an annular groove which is concentric with said hollow shaft member, said annular groove receiving said detent balls when said plate member is set to cover the openings of said cells; and a plurality of recesses formed in the bottom of said annular groove at evenly spaced intervals, each of said recesses having a size to receive a spherical portion of each of said detent balls.

9. An airflow distributing device as claimed in claim 4, further comprising sealing means which is disposed between contacting surface portions of said front wall of said second casing and said plate member.

10. An airflow distributing device as claimed in claim 4, in which an opening is formed in one of said first, second and third partition walls.

11. An airflow distributing device as claimed in claim 4, in which said means to direct air to said ducts comprises a damper swingably disposed in said second casing to take first and second positions.

12. An airflow distributing device as claimed in claim 11, in which the openings of said first, second and third cells are in the shape of sector and arranged to substantially form a circular opening in said front wall of said second casing when combined with each other.

13. An airflow distributing device as claimed in claim 12, in which said plate member is in the shape of circular disc and the opening of said plate member is in the shape of sector, imaginary lines respectively including the side edges of the sector opening of said plate member intersecting at said center portion of the discal plate member.

14. An airflow distributing device as claimed in claim 13, in which the included angle defined by the imaginary lines of the side edges of the sectoral opening of the discal plate member is smaller than that of the sectoral opening of said first cell but larger than that of the sectoral opening of said second cell.

15. An airflow distributing device as claimed in claim 3, in which a leading end of said shaft is projected outwardly from said back wall of said second casing to be fixed with said control means which comprises:

a round gear concentrically fixed to said leading end of said shaft;

a sector gear pivotally mounted to said back wall of said second casing and meshingly engaged with said round gear for driving the same; and a control wire fixed to a portion of said sector gear so as to swingably move said sector gear and thus said plate member via said round gear and said shaft when moved.

16. An airflow distributing device as claimed in claim 15, in which said biasing means comprises a compression spring which is disposed about said shaft between said round gear and said back wall of said second casing.

* * * * *